Aug. 13, 1968 V. L. SCHRIMPER ETAL 3,396,991

TRUCK HOOK FOR BITUMINOUS PAVING MACHINES

Filed June 30, 1966 2 Sheets-Sheet 1

INVENTORS
VERNON L. SCHRIMPER
LOREN E. HERMANN
BY
ATTORNEY

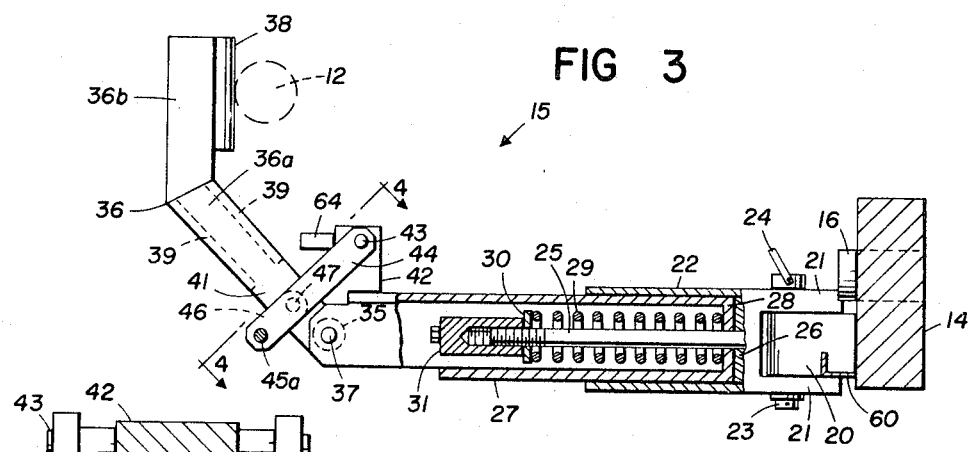
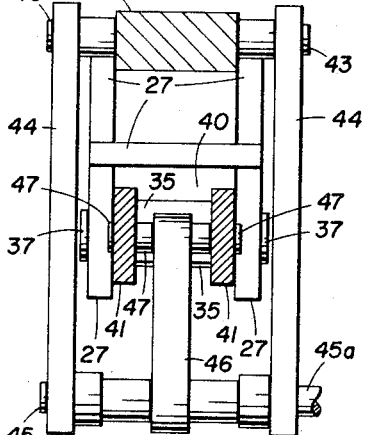
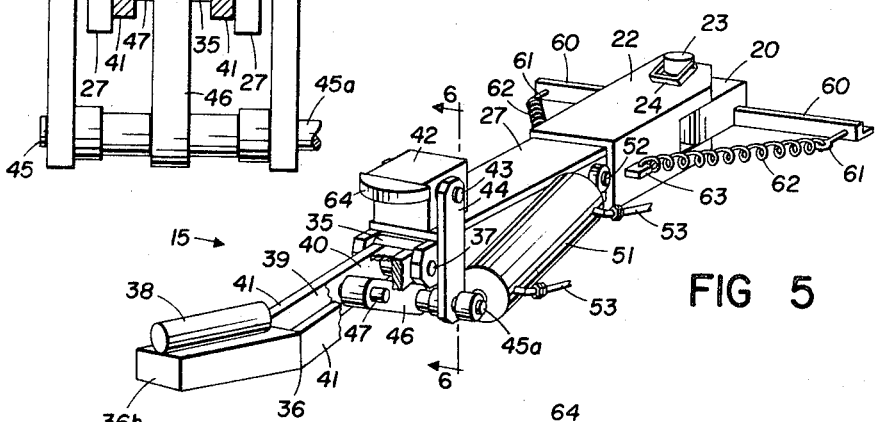
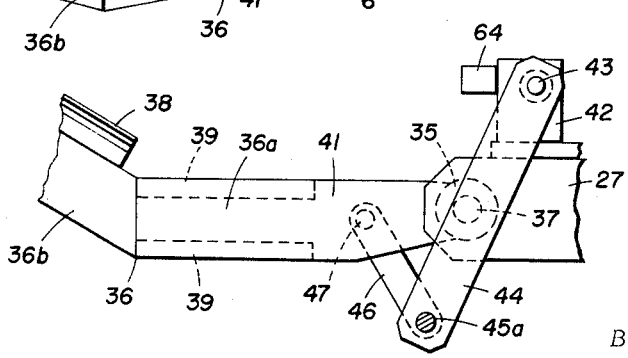
INVENTORS
VERNON L. SCHRIMPER
LOREN E. HERMANN
ATTORNEY ated Aug. 13, 1968

3,396,991
TRUCK HOOK FOR BITUMINOUS PAVING MACHINES
Vernon L. Schrimper and Loren E. Hermann, Cedar Rapids, Iowa, assignors to Iowa Manufacturing Company, Cedar Rapids, Iowa, a corporation of Iowa
Filed June 30, 1966, Ser. No. 561,914
5 Claims. (Cl. 280—479)

ABSTRACT OF THE DISCLOSURE

A hook assembly for engaging the rear axle of a truck while it is unloading bituminous material into the forward hopper of a bituminous paver. A hydraulically operated toggle linkage moves a hook member about a horizontal axis in order to engage and disengage the truck axle, the hook member in the former position holding the truck against the truck push rollers of the paver. The hook assembly is swingable as a unit about a vertical axis at the front of the paver and incorporates a shock absorbing mechanism.

Background of the invention

Most self-propelled bituminous pavers currently in use are equipped with a large forward hopper for receiving bituminous materials from a dump truck with its rear wheels backed against push rollers at the front end of the paver. The truck is thus propelled along the roadway by the paver as it unloads into the hopper. If the grade is up-hill or level, generally all is well, but should the grade be downhill or should the paver's progress be momentarily interrupted and then resumed, thus causing the tires of the truck to bump the push rollers, the truck may get ahead of the paver with the result that some of the material is spilled on the roadway just forward the paver. Conventionally, such spillage is avoided by the truck driver keeping the truck brakes lightly applied during downgrade travel and by care by the paver's operator to avoid bumping the truck while it is unloading. Nevertheless, momentary inattention or carelessness by either the truck driver or the paver operator under these circumstances can cause spillage resulting in wasted materials and delay in paving until the roadway can be cleared.

Summary of the invention

The primary object of the invention, therefore, is the provision of means by which the truck can be easily and positively attached to the paver during its unloading. This object is achieved by a hook device which, in its preferred form, engages the rear axle of the truck so that the latter is locked securely between the push rollers of the paver and the hook. Briefly described, the device employs a hook assembly including a hook member movable from a horizontal released position to an upright position engaging the front of the truck's rear axle assembly, the length of the hook member being sufficient so that various heights of truck axles may be accommodated. The hook member is pivoted at one end to a mounting assembly for movement between its released and engaged positions, and the mounting assembly in turn is pivoted to the forward end of the paver, at a location offset from the latter's center line so that it will not interfere with the truck's differential housing and drive shaft, for horizontal swinging movement. The latter movement permits the entire device to deflect horizontally to either side of a central position in order to avoid injury to the truck or the hook member during engagement of the truck by the paver. The hook member is operated by a hydraulic ram, controlled by the paver operator, which makes and breaks a toggle linkage when moving the hook member between its engaged and released position, respectively. In order to accommodate sudden jerks which tend to separate the truck and the paver, the mounting assembly also incorporates a shock absorbing unit which permits resilient forward movement of the hook member, its toggle linkage and the operating arm as a unit relative to the paver.

These and other objects, features and advantages of the present invention will become apparent from the preferred form hereafter described in detail, being the best mode contemplated for carrying out the invention.

Brief description of the drawings

FIGURE 3 is a detail sectional view taken along the line 3—3 of FIGURE 1, certain portions being further broken away;

FIGURE 4 is a detail sectional view taken along the line 4—4 of FIGURE 3;

FIGURE 5 is an upper perspective view of the hook device itself in its released position, certain portions being broken away; and FIGURE 6 is a detail sectional view taken along the lines 6—6 of FIGURE 5.

Description of a preferred embodiment

Figure 1:
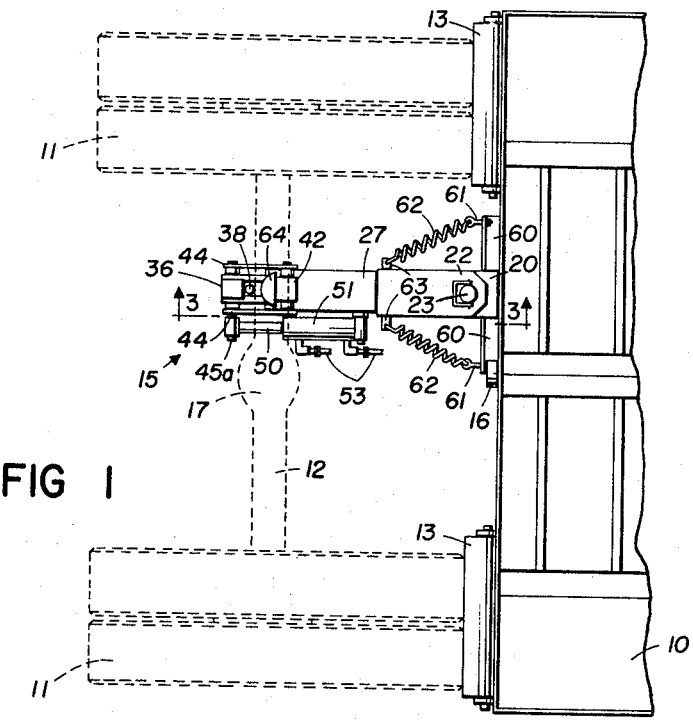
FIGURE 1 is a partial top plan view of the forward end of a typical self-propelled bituminous paver illustrating a hook device according to the present invention engaged with the rear axle assembly of a truck, the latter being shown in phantom lines.
Figure 2:
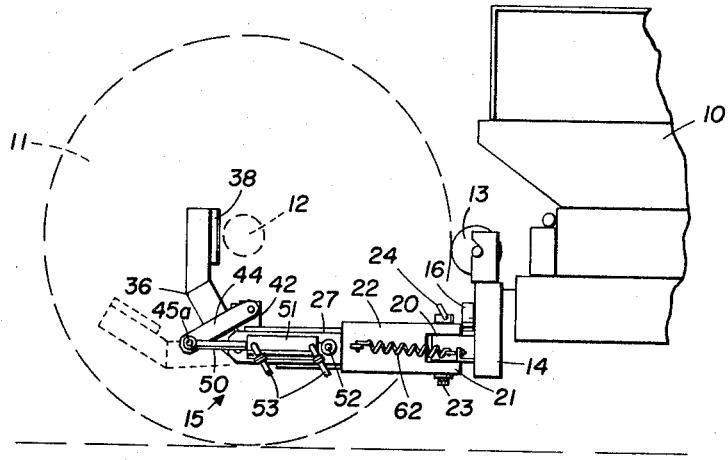
FIGURE 2 is a side elevation of the view of FIGURE 1, the released position of the hook member being shown in broken lines.

In FIGURES 1 and 2 a large, forwardly carried hopper 10 of a conventional type of self-propelled bituminous paver receives bituminous materials from the dump of a truck whose wheels 11 of its rear axle assembly 12 are engaged by a pair of horizontal push rollers 13 journaled atop an oscillating beam 14 forming a portion of the paver's suspension. In the type of paver illustrated the beam 14 is below the height of the rear axle assembly 12 of trucks of the nature concerned. Accordingly, beam 14 affords a ready location for the hook device, generally indicated at 15, which extends horizontally forward therefrom below the height of the axle assembly 12 and at a location sufficiently to one side of the central pivot 16 of beam 14 in order to avoid the differential housing 17 of the truck's rear axle assembly 12. In the case of pavers with other types of suspension some other readily available location at the front end below the height of the truck's axle assembly may be used to mount the hook device 15.

The hook device 15 comprises a mounting assembly having a forwardly extending supporting hub 20, securely fixed to the front face of beam 14, to which in turn is fitted the yoked rear end 21 of a forwardly extending sleeve 22 generally rectangular in section and fabricated from suitable plate stock. The latter is pivoted to hub 20 for horizontal swinging movement to either side of a central position by means of a vertical pin 23 through the yoke 21 and hub 20, the upper end of pin 23 being shouldered and provided with a handle 24 in order to permit ready detachment of the entire device 15 from the paver. The forward end of the sleeve 22 is open and is provided therewithin with a mounting rod 25, fixed to the center of the exposed front face 26 of the yoke 21, which extends forward axially of sleeve 22 beyond its open end. The sleeve 22 slidably receives therewithin a complementary hollow slide 27, also fabricated from suitable plate stock, which spacedly encompasses mounting rod 25, the rear end of slide 27 being closed by an end plate 28 which is bored to permit passage therethrough of rod 25 and which butts against the exposed face 26 of the yoke 21 when slide 27 is fully collapsed within sleeve 22. A suitable compressible coil spring 29 encompasses rod 25 within slide 27, one end of spring 29 abutting the inner face of end plate 28 and the other the opposed face of a washer 30 adjustably positioned on the front end of rod 25 by means of an adjusting nut 31 threaded thereon. Accordingly, a shock absorbing assembly is thereby provided in that slide 27 is resiliently movable outwardly from sleeve 22 against spring 29, the tension of the latter being varied when nut 31 is turned in or out.

The hook assembly is carried by the forward end of slide 27 which is vertically bifurcated to receive therebetween a bushing 35 secured to the rear end of a hook member 36. Bushing 35 is pivoted upon a horizontal pivot pin 37 through the side walls of slide 27 so that hook member 36 may pivot vertically as shown between a generally horizontal, forwardly extending released position and an upright engaged position with the rear axle assembly 12 of the truck. The hook member 36 includes two portions, each generally rectangular in section, an inner one 36a carrying the bushing 35 and an outer portion 36b welded thereto, being somewhat vertically cranked with respect to the inner portion 36a and carrying along its rear face a suitable bumper 38. The outer portion 36b is solid and it and its bumper 38 are sufficiently extensive so as to be able to accommodate different heights of truck axles. The inner portion 36a is hollow, being fabricated of suitable plate stock, and its upper and lower walls 39 are cut back at the rear to provide a vertical slot 40 between the side walls 41 for purposes to be described.

The remainder of the hook assembly includes a rectangular pivot block 42 welded to the top wall of the forward end of slide 27 having lateral end faces parallel to each other and perpendicular to the axis of pin 37. The two end faces of block 42 are centrally bored to receive a pivot pin 43, parallel to pin 37, to whose outer ends are bushed one pair of the ends of a pair of link bars 44 which straddle the forward end of slide 27 and the rear end of hook member 36 and extend forwardly and downwardly therebeyond. The other pair of ends of link bars 44 are bushed to a pivot pin 45, parallel to pins 37 and 43, passing therebetween beneath the lower wall 39 of the inner portion 36a of hook member 36. To pivot pin 45 between link bars 44 is bushed one end of a toggle link 46 which extends rearwardly and upwardly through the slot 40 in the inner portion 36a of hook member 36, the other end of toggle link 46 being journaled about a short pivot pin 47 carried by the side walls 41 of inner portion 36a and parallel to pins 37, 43 and 45.

One end of pin 45 is extended at 45a to which is bushed the outer end of the piston rod 50 of a two-way hydraulic ram 51 which is bushed at its other end to a trunnion 52 carried by the exposed portion of the adjacent side wall of slide 27 when the latter is fully collapsed within sleeve 22. The ram 51 thus forms an operating means for the hook assembly and is suitably connected into the paver's hydraulic system by means of flexible hoses 53 so that ram 51 may be energized from the control panel (not shown) located before the paver's operator. Accordingly, when hook member 36 is in its released position, as in FIGURES 5 and 6, the truck may be backed with its wheels 11 against push rollers 13, the entire hook device 15 thus passing beneath axle assembly 12. Then when ram 51 is extended, link bars 44 and toggle link 46 cooperate to swing hook member 36 about pin 37 so that when hook member 36 is in its upright engaged position, the axes of pins 43, 45 and 47 all lie in a common plane, thus establishing the toggle and locking hook member 36 against the rear axle assembly 12 of the truck, as in FIGURES 1–4. The truck is thus securely held between the push rollers 13 and the hook member 36. Conversely, contraction of ram 51 will swing link bars 44 and pin 45 about pin 43, thus both swinging toggle link 46 about pin 47 to break the lock and simultaneously moving toggle link 46 and hook member 36 downwardly to its released position disengaged from the axle assembly 12, whereupon the truck may be driven away. It will be apparent, of course, that the respective lengths of link bars 44 and toggle link 46, as well as the spacing of the axes of pivot pins 43, 45 and 47 relative to each other and pivot pin 37, must be all suitably related to each other in order to achieve the cooperation just described, all of which can be readily accomplished by those skilled in the art. At the same time, since the hook member 36, its toggle linkage and operating ram 51, are all carried by slide 27, any unwanted jerks or sudden forward lunges of the truck are absorbed by the spring 29.

In order to maintain the entire hook device 15 in its forward central position about pivot pin 23, the ends of a pair of short lengths of angle iron 60 are welded to the sides of the supporting hub 20 and extend laterally therefrom along the front face of the oscillating beam 14. The remote ends of the angle irons 60 are fitted with suitable anchors 61 for the rear ends of a pair of extensible coil springs 62 which extend convergingly forward and are secured at their forward ends to a pair of brackets 63 extending laterally from adjacent the forward end of sleeve 22. Thus the hook device 15 may resiliently deflect to one side or the other of its central position in order to avoid injury when the truck is being backed against the forward end of the paver preparatory to engaging its rear axle with hook member 36. To the same end, the forward face of the pivot block 42 is fitted with a horizontally convex bumper 64 tending to deflect the entire device to one side or the other should some obstruction be encountered during the axle engaging procedure or otherwise.

Though the present invention has been described in terms of a particular embodiment thereof and detailed descriptive language has been employed, it is not limited to that embodiment alone. Instead, the following claims are to be read as encompassing all modifications and adaptations of the invention falling within the spirit and scope thereof.

We claim:

1. In combination with a self-propelled bituminous paving machine, a truck hook device comprising: a hook mounting assembly secured to the forward end of said machine; a hook assembly carried by said mounting assembly and movable with respect to said mounting assembly from a released position to an engaged position with a portion of the axle assembly lying between the rear wheels of a truck disposed forwardly of said machine and propelled along the roadway by contact between the forward end of said machine and said wheels as said machine moves along the roadway, said hook assembly including a hook member pivoted to the forward end of said mounting assembly about a transverse, generally horizontal hook axis effective to permit movement of said hook member between a generally horizontal released position and a generally upright engaged position with a forward portion of said rear axle assembly of the truck, and means to releasably lock said assembly in said engaged position, said engaged position being effective to control forward movement of the truck on the roadway relative to said machine, said releasable locking means including a toggle linkage operative between said mounting assembly and said hook member and comprising a pair of swinging links straddling said hook member and pivoted at one pair of their ends to said mounting assembly about a first toggle axis disposed from said hook axis, said hook assembly moving means being pivoted to the other pair of ends of said links about a second toggle axis disposed from said hook axis and said first toggle axis, and a toggle link pivoted at one end between said swinging links about said second toggle axis and at its other end to said hook member about a third toggle axis disposed both between said hook axis and the axle engaging portion of said hook member and between said first and second toggle axes, all of said toggle axes being parallel to said hook axis and spaced therefrom and from each other effective to cause all said toggle axes to lie in a common plane when said hook member is in its axle engaged position; and means to move said hook assembly between said positions thereof.

2. The device of claim 1, wherein said hook assembly moving means includes a forwardly extending two-way fluid ram pivotally mounted at its rear end to said mounting assembly and at its forward end to said other pair of ends of said swinging link about said second toggle axis.

3. The device of claim 2 wherein said mounting assembly includes shock absorbing means effective to resiliently permit forward movement of said hook assembly and the truck relative to said machine while the truck is engaged by said hook member.

4. The device of claim 3 wherein said mounting assembly comprises a forwardly projecting mounting member secured at its rear end to the forward end of said machine and having a forwardly extending sleeve at its forward end, the forward end of said sleeve being open and having a forwardly extending spring mounting rod centrally and spacedly disposed therewithin secured to said mounting member at the rear end of said sleeve, a hollow slide partially disposed in said sleeve in spaced encompassing relation to said rod and slidably movable therein between retracted and extended positions, said hook assembly being carried by the forward end of said slide and said rear pivot of said ram by the exposed portion of said slide when in its retracted position, and wherein said shock absorbing means includes a compressible helical spring disposed within said slide between the rear end thereof and the forward end of said rod and encompassing the latter effective to permit resilient movement of said slide between its retracted and extended positions.

5. The device of claim 4 wherein said mounting member is pivotally secured at its rear end to the forward end of said machine about a vertical axis for horizontal swinging movement of said mounting assembly to each side of a central forwardly extending position, and means resiliently maintaining said mounting member and thus said hook member in said central position, said means including a spring anchor laterally disposed on each side of said mounting member and an extensible helical spring connected between each of said anchors and said mounting member.

References Cited

UNITED STATES PATENTS

| | | | |
|---|---|---|---|
| 2,109,020 | 2/1938 | Abernathy. | |
| 2,717,783 | 9/1955 | Flink. | |
| 2,742,304 | 4/1956 | Clausen | 280—460 |
| 2,800,340 | 7/1957 | Standfuss | 280—447 |
| 2,954,241 | 9/1960 | Warren | 280—460 X |
| 3,275,342 | 9/1966 | Layton | 280—479 X |
| 3,295,866 | 1/1967 | Standfuss | 280—460 X |

LEO FRIAGLIA, *Primary Examiner.*